United States Patent
Yoneyama et al.

(10) Patent No.: US 6,856,469 B2
(45) Date of Patent: Feb. 15, 2005

(54) LENS DRIVING DEVICE

(75) Inventors: Hidekazu Yoneyama, Nagano (JP); Yuji Fujita, Nagano (JP); Takahiro Azuma, Nagano (JP); Shinichi Kudo, Nagano (JP); Toshifumi Tsuruta, Nagano (JP)

(73) Assignee: Sankyo Seiki Mfg. Co., Ltd., Nagano (JP)

( * ) Notice: Subject to any disclaimer, the term of this patent is extended or adjusted under 35 U.S.C. 154(b) by 0 days.

(21) Appl. No.: 10/695,409

(22) Filed: Oct. 27, 2003

(65) Prior Publication Data

US 2004/0130808 A1 Jul. 8, 2004

(30) Foreign Application Priority Data

Dec. 4, 2002 (JP) .................................... 2002-353040

(51) Int. Cl.[7] .................. G02B 15/14; G02B 7/02; G03B 13/34; G03B 9/02; H02K 41/00
(52) U.S. Cl. ............. 359/696; 359/823; 359/824; 359/814; 359/198; 396/133; 396/508; 396/219; 310/12; 310/49 R
(58) Field of Search ................. 359/696, 814, 359/823, 824, 697, 703, 707, 198, 200; 396/133, 219, 257, 508; 310/12, 49 R

(56) References Cited

U.S. PATENT DOCUMENTS

| | | | | |
|---|---|---|---|---|
| 4,676,605 A | * | 6/1987 | Toda et al. ................ 359/696 |
| 5,289,318 A | * | 2/1994 | Sekine et al. .............. 359/813 |
| 5,373,496 A | * | 12/1994 | Tomita et al. ............. 720/682 |
| 5,442,490 A | * | 8/1995 | Suzuki ....................... 359/824 |
| 5,471,100 A | * | 11/1995 | Sakamoto et al. .......... 310/12 |
| 5,488,603 A | * | 1/1996 | Tomita et al. ............. 720/683 |
| 5,587,846 A | * | 12/1996 | Miyano et al. ............. 359/824 |
| 5,638,222 A | * | 6/1997 | Shigehara ................... 359/814 |
| 5,705,864 A | * | 1/1998 | Takano et al. ............ 310/49 R |
| 5,739,608 A | * | 4/1998 | Kim ........................... 310/90.5 |
| 5,900,995 A | * | 5/1999 | Akada et al. ............... 359/824 |
| 6,031,651 A | * | 2/2000 | Nakasugi .................... 359/200 |
| 6,414,777 B1 | * | 7/2002 | Miyamoto .................. 359/198 |

FOREIGN PATENT DOCUMENTS

| JP | 04-222444 | 8/1992 |
|---|---|---|
| JP | 10-150759 | 6/1998 |
| JP | 2000-187862 | 7/2000 |

* cited by examiner

*Primary Examiner*—Loha Ben
(74) *Attorney, Agent, or Firm*—Hogan & Hartson, LLP

(57) ABSTRACT

A lens driving device includes a moving body equipped with a lens and a driving magnet attached to the lens, and a fixed body that is equipped with a driving coil that forms together with the driving magnet a magnetic circuit and moves the moving body in an optical axis direction of the lens between a first lens retaining position and a second lens retaining position, and at least one magnetic member disposed adjacent to at least one of two end sections in the optical axis direction of the driving magnet. The moving body is retained at the first lens retaining position by magnetic attraction caused by the driving magnet and the magnetic member when energization of the driving coil is stopped. Accordingly, the driving coil does not need to be energized while the lens is retained at the first lens retaining position.

22 Claims, 3 Drawing Sheets

LENS DRIVING DEVICE

BACKGROUND OF THE INVENTION:

1. Field of the Invention

The present invention relates to lens driving devices that are generally used for cameras such as cameras mounted on cellular phones. More particularly, the present invention relates to the technology to drive, position and retain a lens or a lens unit in an optical axial direction.

2. Related Background Art

A camera device that is mounted on a cellular phone (i.e., portable telephone) with camera typically uses a driving system that drives a lens between two positions, an ordinary photographing position where an ordinary photographing takes place, and a close-up photographing position where the lens is positioned slightly closer to subject by a predetermined distance than its position in the ordinary photographing. However, it would not be practical, from a size point of view, to mount a lens driving device equipped with a motor on equipment such as cellular phones with camera. For this reason, lens driving devices of the type which directly, magnetically drives a lens is mounted on cellular phones with camera.

A lens driving device of a magnetic drive type is typically equipped with a cylindrical case that retains a lens, a ring-shaped drive magnet mounted on an outer circumference of the case, and a driving coil that opposes the driving magnet. Energization of the driving coil is controlled to magnetically drive the cylindrical case that retains the lens in an optical axis direction to a desired position, and the cylindrical case is magnetically retained at the desired position.

Also, another lens driving device may be equipped with a case having a lens mounted thereon, wherein the case is rotated in its circumferential direction by the driving device such that the case is moved in an optical axis direction.

However, in the former type, namely, the lens driving device in which the case that retains the lens is magnetically driven in an optical axis direction to a desired position and the case is magnetically retained at the position, if the lens is to be retained at the position for a long period of time, the driving coil needs to be energized during that period. For this reason, the lens driving device of the former type has a problem, namely, it consumes a large amount of power, and therefore is not suitable for mounting on cellular phones with camera.

In contrast, in the latter type, namely, the lens driving device in which the case is rotated in its circumferential direction to move the case in a rotational axis direction (i.e., optical axis direction), there is an advantage that the lens driving device has a relatively low power consumption. However, the lens driving device of the latter type has a complex structure and includes a large number of components, and therefore is not suitable for mounting on cellular phones with camera.

SUMMARY OF THE INVENTION

In view of the problems described above, the present invention relates to a lens driving device that has a relatively simple structure and yet reduce power consumption for driving, positioning and retaining a lens.

In accordance with an embodiment of the present invention, a lens driving device includes a moving body equipped with a lens, and a fixed body that moves the moving body in an optical axis direction of the lens between a first lens retaining position and a second lens retaining position and retains the moving body at the two lens retaining positions. The moving body is equipped with the lens and a driving magnet attached to the lens. The fixed body is equipped with a driving coil that forms together with the driving magnet a magnetic circuit, and a magnetic member that is disposed opposite at least one of two end sections in the optical axis direction of the driving magnet. When energization of the driving coil stops, the moving body is retained at the first lens retaining position by magnetic attraction caused by the driving magnet and the magnetic member; and the driving coil is energized to move the moving body between the first lens retaining position and the second lens retaining position.

In accordance with the present embodiment, when the lens is to be moved between the first lens retaining position and the second lens retaining position, the driving coil is energized to magnetically drive the moving body. However, when the lens is to be retained at the first lens retaining position, energization of the driving coil is stopped, and a magnetic attraction force between the driving magnet and the magnetic member is used to retain the moving body at the first lens retaining position. Accordingly, while the lens is retained at the first lens retaining position, the driving coil does not need to be energized, and thus the power consumption can be lowered.

In a preferred embodiment of the present invention, the magnetic member may include a first magnetic member that is disposed on a side adjacent to the first lens retaining position and a second magnetic member that is disposed on a side adjacent to the second lens retaining position. Preferably, the moving body may be retained at the first lens retaining position by magnetic attraction caused by the driving magnet and the first magnetic member when energization of the driving coil is stopped, or retained at the second lens retaining position by magnetic attraction caused by the driving magnet and the second magnetic member when energization of the driving coil is stopped. With this structure, when the lens is to be retained at the second lens retaining position, energization of the driving coil is stopped to use a magnetic attraction force working between the driving magnet and the second magnetic member. As a result, the driving coil does not need to be energized while the lens is retained at the second lens retaining position, and therefore the power consumption can be reduced to a lower level.

In accordance with a preferred embodiment of the present invention, the fixed body may preferably be equipped with a spring member that moveably supports the moving body in the optical axis direction. By this structure, the spring force of the spring member can be used, for example, to retain the lens at the first lens retaining position, to move the lens from the first lens retaining position to the second lens retaining position, to move the lens from the second lens retaining position to the first lens retaining position, or to retain the lens at the second lens retaining position.

In accordance with a preferred embodiment of the present invention, the moving body may preferably be equipped with a back yoke provided on a backside of the driving magnet opposite the driving coil. With this structure, the magnetic efficiency can be improved.

In accordance with an embodiment of the present invention, the driving coil may preferably be formed in a cylindrical shape that encircles the moving body, and the fixed body may preferably be equipped with a stator yoke having a generally rectangular cross section, a cornered channel-shaped cross section or a generally C-letter shaped cross section that generally encircles the driving coil. By this structure, an optimum magnetic path can be formed between the driving magnet and the driving coil, and thus the magnetic efficiency can be improved.

Other features and advantages of the invention will be apparent from the following detailed description, taken in conjunction with the accompanying drawings that illustrate, by way of example, various features of embodiments of the invention.

PREFERRED EMBODIMENT OF THE INVENTION

A lens driving device in accordance with an embodiment of the present invention will be described below with reference to the accompanying drawings.

[Overall Structure]

Figure 1:
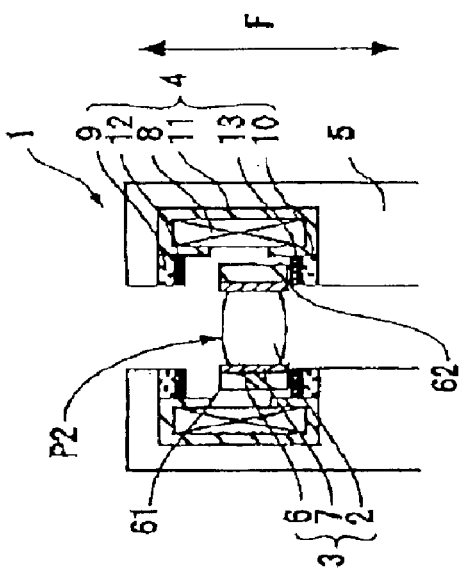
FIGS. 1(a), 1(b) and 1(c) schematically show cross-sectional views of a lens driving device in accordance with an embodiment of the present invention in a state in which a lens is retained at a first lens retaining position, a state in which the lens is in the course of moving from the first lens retaining position to a second lens retaining position, and a state in which the lens is retained at the second lens retaining position, respectively.
Figure 1:
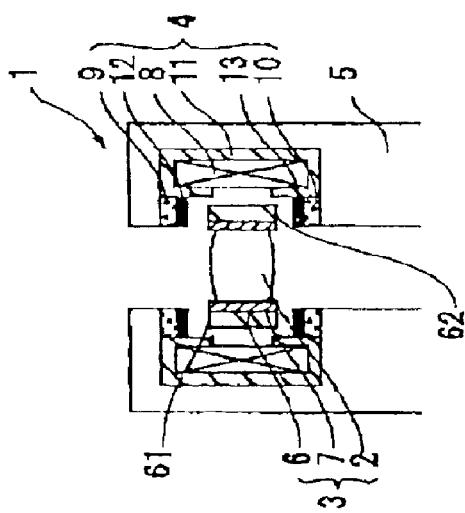
Figure 1:
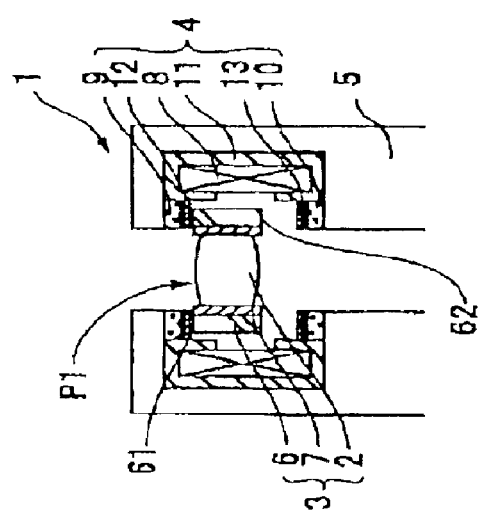
Figure 2:
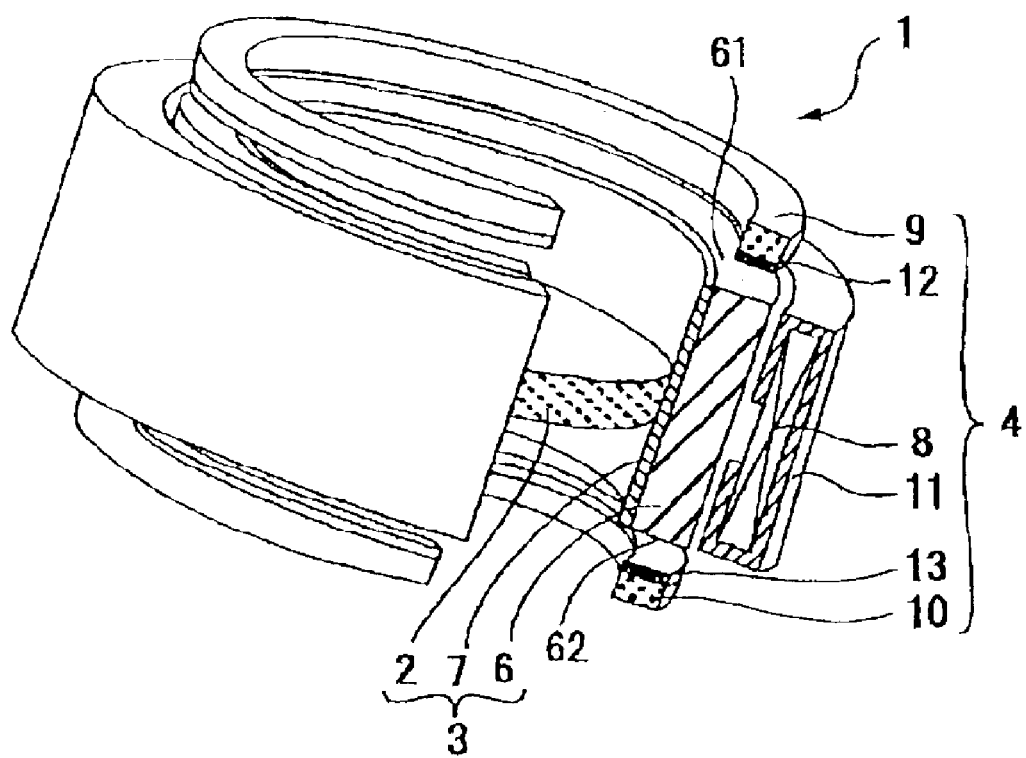
FIG. 2 shows an enlarged perspective view of parts of the lens driving device shown in FIGS. 1(a), 1(b) and 1(c).

FIGS. 1(a), 1(b) and 1(c) schematically show cross-sectional views of a lens driving device in accordance with an embodiment of the present invention in a state in which a lens is retained at a first lens retaining position, a state in which the lens is in the course of moving from the first lens retaining position to a second lens retaining position, and a state in which the lens is retained at the second lens retaining position, respectively. FIG. 2 shows an enlarged perspective view of parts of the lens driving device shown in FIGS. 1(a), 1(b) and 1(c).

As indicated in FIGS. 1(a), 1(b) and 1(c) and FIG. 2, the lens driving device 1 may be used to drive a lens 2 in a thin camera that is mounted on a portable device such as a cellular phone with camera. The lens driving device 1 is generally formed from a lens moving body 3 that is equipped with the lens 2, a fixed body 4 that moves the moving body 3 in an optical axis direction F (i.e., a focusing direction) of the lens 2 between a first lens retaining position P1 and a second lens retaining position 2 and retains the moving body 3 at the two lens retaining positions P1 and P2, and a case 5 that stores the moving body 3 and the fixed body 4. The case 5 is formed with an aperture on the subject side (on the upper side of the figure, and a light path on the device interior side (on the lower side of the figure).

The lens moving body 3 is equipped with the lens 2, and a driving magnet 6 in a ring shape that encircles the outer circumference of the lens 2. The driving magnet 6 and the lens 2 are attached to each other with a ring-shaped back yoke 7 interposed between them. The back yoke 7 also serves as a lens-barrel of the lens 2.

Figure 3:
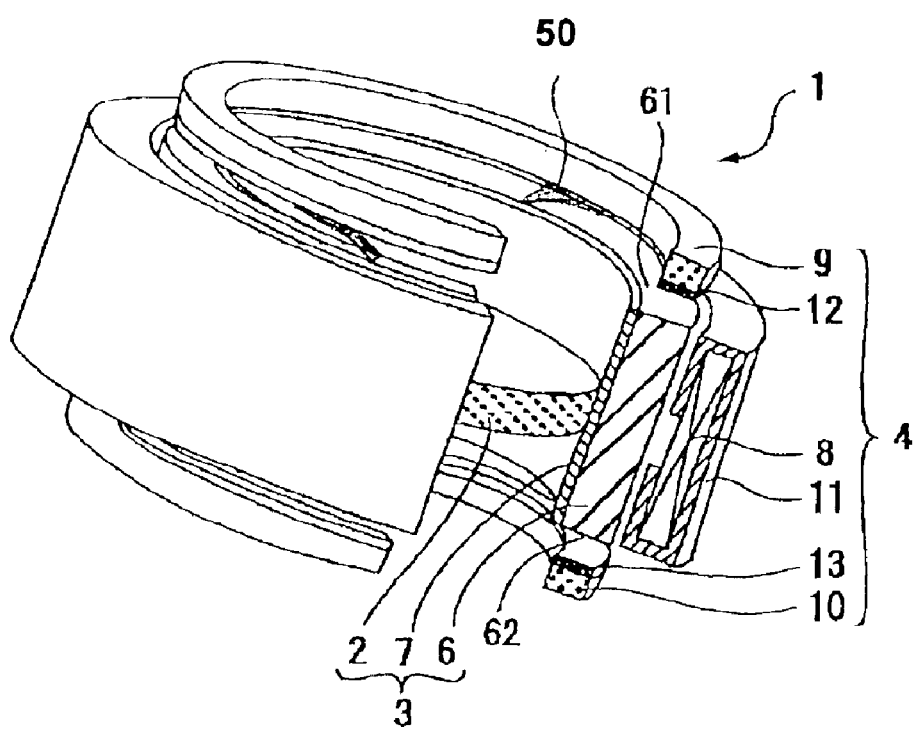
FIG. 3 shows an enlarged perspective view of parts of the lens driving device in accordance with another embodiment of the present invention.

The fixed body 4 may be equipped with a spring member 50 (see FIG. 3) such as a leaf spring or a coil spring that resiliently and moveably supports the lens 2 in the optical axis direction F, a cylindrical driving coil 8 that encircles the outer circumference of the driving magnet 6, a stator yoke 11 having a channel-shaped cross section or a C letter-shaped cross section that generally encircles the driving coil 8, and first and second washers 9 and 10 that are disposed opposite end faces 61 and 62 of the driving magnet 6 on the sides of the first and second lens retaining positions P1 and P2, respectively. In the present embodiment, the stator yoke 11 has a generally rectangular cross section that opens at one side to generally define a cornered C letter-shape. The first and second washers 9 and 10 are both made of ring-shaped magnetic members that may preferably be made of ferro-magnetic material. Spacer members 12 and 13, that may preferably be made of non-magnetic flexible material, are attached to end faces of the first and second washers 9 and 10 which oppose the end faces 61 and 62 of the driving magnet 6, respectively.

In accordance with an embodiment example, measurements of the components described above may be as follows:

Driving magnet 6:
  Outer diameter=3.7 mm; Inner diameter=3.1 mm; Height=1.6 mm
Back yoke 7:
  Outer diameter=3.1 mm; Inner diameter=2.9 mm; Height=1.6 mm
Driving coil 8:
  Outer diameter=4.5 mm; Inner diameter=4.1 mm; Height=1.4 mm
Washers 9 and 10:
  Outer diameter=3.9 mm; Inner diameter=3.1 mm; Height=0.25 mm
Stator yoke 11:
  Outer diameter=4.7 mm; Inner diameter=3.9 mm; Height=1.6 mm;
  Plate thickness=1.6 mm
Spacer members 12 and 13:
  Outer diameter=3.9 mm; Inner diameter=3.1 mm; Height=0.1 mm Also, in accordance with the present embodiment, Neodymium-plastic magnet is used as the driving magnet 6, whose coercive force (bHc) is 448 kA/m or greater. In the mean time, the driving coil 8 is structured to generate a thrust of 100 mN or greater.

[Lens Driving Operation]

With the lens driving device 1 thus configured, the lens 2 is driven as follows:

First, in a state indicated in FIG. 1(a), the lens 2 (moving body 3) is at the first lens retaining position P1, and energization of the driving coil 8 is stopped in this state. However, the driving magnet 6 and the first magnetic member 9 are magnetically attracted to each other through the spacer member 12, such that the moving body 3 is retained at the first lens retaining position P1. Accordingly, in this state, subjects can be photographed with the cellular phone with camera.

When the lens 2 (moving body 3) is moved from the current state, namely, the first lens retaining position P1, to the second lens retaining position P2, the driving coil 8 is energized. As a result, as indicated in FIG. 1(b), the driving magnet 6 is separated from the first magnetic member 9 by a magnetic force generated by the driving coil 8 and the driving magnet 6, such that the moving element 3 moves to the second lens retaining position P2 as indicated in FIG.

1(c). As a result, the driving magnet 6 and the second magnetic member 10 are brought in a state in which the driving magnet 6 and the second magnetic member 10 are magnetically attracted to each other through the spacer member 13. In this instance, the driving magnet 6 abuts against the spacer member 13, and its impact is absorbed by the spacer member 13.

In the state in which the driving magnet 6 and the second magnetic member 10 are magnetically attracted to each other through the spacer member 13, the moving body 3 is retained at the second lens retaining position P2 when the energization of the driving coil 8 is stopped. Accordingly, a photograph can be normally taken by the cellular phone with camera.

It is noted that operations in which the lens 2 (i.e., the moving body 3) is moved from the second lens retaining position P2 to the first lens retaining position P1 are principally the same as those operations described above, their description are omitted.

According to the present embodiment, when the lens 2 is to be moved between the first lens retaining position P1 and the second lens retaining position P2, the driving coil 8 is energized to magnetically drive the moving body 3; and when the lens 2 is to be retained at the first lens retaining position P1 or the second lens retaining position P2, the energization of the driving coil 8 is stopped to use the magnetic attraction force between the driving magnet 6 and the magnetic member 9 or 10, respectively. Accordingly, while the lens 2 is retained at the first lens retaining position P1 or the second lens retaining position P2, the driving coil 8 does not need to be energized, and therefore the power consumption can be suppressed to low levels.

Furthermore, the fixed body 4 is equipped with the spring member 50 that moveably supports the moving body 3 in the optical axis direction F, and the spring force (i.e., thrust) of the spring member 50 can be used to drive, position and retain the moving body 3 (i.e., the lens 2).

In the present embodiment, the spring member 50 is provided such that the thrust of the spring member acts to move the moving body 3 from the first lens retaining position P1 to the second lens retaining position P2. Alternatively, the spring member 50 may be provided such that the thrust of the spring member acts to move the moving body 3 from the second lens retaining position P2 to the first lens retaining position P1. Moreover, the spring member 50 may be provided such that the thrust of the spring member acts to retain the moving body 3 generally at mid-point between the first lens retaining position P1 and the second lens retaining position P2. In this case, two spring members may be provided at the two end faces 61 and 62 of the driving magnet 6.

When the thrust of the spring member acts to move the moving body 3 from the first lens retaining position P1 to the second lens retaining position P2, the spring force of the spring member can be used to move the lens 2 from the first lens retaining position P1 to the second lens retaining position P2, and to retain the lens 2 at the second lens retaining position P2. When the thrust of the spring member acts to move the moving body 3 from the second lens retaining position P2 to the first lens retaining position P1, the spring force of the spring member can be used to move the lens 2 from the second lens retaining position P2 to the first lens retaining position P1, and to retain the lens 2 at the first lens retaining position P1. When the thrust of the spring member acts to retain the moving body 3 at mid-point between the first lens retaining position P1 and the second lens retaining position P2, the spring force of the spring member can be used to move the lens 2 from the first lens retaining position P1 to the second lens retaining position P2, and to move the lens 2 from the second lens retaining position P2 to the first lens retaining position P1.

In the embodiment example described above, the driving magnet 6 is mounted on the lens 2 that is a moving body, and the driving coil 8 is disposed on the fixed body 4 to thereby form a plunger (moving magnet) type. However, in reverse, the driving coil may be attached on the side of the lens 2 that is a moving body, and the driving magnet may be disposed on the fixed body 4 to form a voice coil (moving coil) type. The plunger type of the present embodiment may be simpler in structure than the voice coil type.

As described above, the lens driving device in accordance with an embodiment of the present invention energizes the driving coil to magnetically drive the moving body when the moving body equipped with the lens is moved between the first lens retaining position and the second lens retaining position. However, when the lens is to be retained at the first or second lens retaining position, energization of the driving coil is stopped to use the magnetic attraction force between the driving magnet and the magnetic member provided at each end side of the driving magnet. Accordingly, since the driving coil does not need to be energized while the lens is retained at the first or second lens retaining position, the power consumption can be suppressed to lower levels.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A lens driving device comprising:
    a moving body equipped with a lens and a driving magnet attached to the lens; and
    a fixed body that is equipped with a driving coil that forms together with the driving magnet a magnetic circuit and moves the moving body in an optical axis direction of the lens between a first lens retaining position and a second lens retaining position and retains the moving body at the first and second lens retaining positions;
    and a magnetic member that is disposed opposite at least one of two end sections in the optical axis direction of the driving magnet.

2. A lens driving device according to claim 1, wherein the moving body is retained at the first lens retaining position by magnetic attraction caused by the driving magnet and the magnetic member when energization of the driving coil is stopped.

3. A lens driving device according to claim 1, wherein the moving body moves between the first lens retaining position and the second lens retaining position when the driving coil is energized.

4. A lens driving device according to claim 1, wherein the moving body is retained at the first lens retaining position by magnetic attraction caused by the driving magnet and the magnetic member when energization of the driving coil is stopped, and the moving body moves between the first lens retaining position and the second lens retaining position when the driving coil is energized.

5. A lens driving device according to claim 1, wherein the magnetic member includes a first magnetic member that is disposed adjacent to the first lens retaining position and a second magnetic member that is disposed adjacent to the second lens retaining position.

6. A lens driving device according to claim 5, wherein the moving body is retained at the first lens retaining position by magnetic attraction caused by the driving magnet and the first magnetic member when energization of the driving coil is stopped.

7. A lens driving device according to claim 5, wherein the moving body is retained at the second lens retaining position by magnetic attraction caused by the driving magnet and the second magnetic member when energization of the driving coil is stopped.

8. A lens driving device according to claim 5, wherein energization of the driving coil is stopped when magnetic attraction caused by the driving magnet and the first magnetic member retains the moving body at the first lens retaining position, and energization of the driving coil is stopped when magnetic attraction caused by the driving magnet and the second magnetic member retains the moving body at the second lens retaining position.

9. A lens driving device according to claim 1, wherein the fixed body includes a spring member that moveably supports the moving body in the optical axis direction.

10. A lens driving device according to claim 1, wherein the moving body includes a back yoke provided on a side of the driving magnet opposite the driving coil.

11. A lens driving device according to claim 1, wherein the driving coil is in a cylindrical shape that encircles the moving body, and the fixed body includes a stator yoke that generally encircles the driving coil.

12. A lens driving device according to claim 11, wherein the fixed body has a generally rectangular cross section having an opening to define a cornered C-letter shape.

13. A lens driving device comprising:
a moving body including a cylindrical lens barrel, a lens mounted inside the lens barrel and a driving magnet attached outside the lens barrel; and
a fixed body that is disposed adjacent to an outer circumferential surface of the moving body, wherein the fixed body includes a driving coil that forms together with the driving magnet a magnetic circuit; and
a magnetic member that is disposed adjacent to at least one of two end sections in the optical axis direction of the driving magnet for magnetically retaining the moving body.

14. A lens driving device according to claim 13, wherein the moving body is moveable with respect to the fixed body in an optical axis direction of the lens between a first lens retaining position and a second lens retaining position when the driving coil is energized.

15. A lens driving device according to claim 14, wherein the magnetic member includes a first magnetic member that is disposed adjacent to the first lens retaining position and a second magnetic member that is disposed adjacent to the second lens retaining position.

16. A lens driving device according to claim 15, wherein the driving coil is not energized when magnetic attraction caused by the driving magnet and the first magnetic member retains the moving body at the first lens retaining position.

17. A lens driving device according to claim 15, wherein the driving coil is not energized when magnetic attraction caused by the driving magnet and the second magnetic member retains the moving body at the second lens retaining position.

18. A lens driving device according to claim 15, wherein the driving coil is not energized when magnetic attraction caused by the driving magnet and the first magnetic member retains the moving body at the first lens retaining position, and the driving coil is not energized when magnetic attraction caused by the driving magnet and the second magnetic member retains the moving body at the second lens retaining position.

19. A lens driving device according to claim 13, wherein the fixed body includes a spring member that moveably supports the moving body in the optical axis direction.

20. A lens driving device according to claim 13, wherein the lens barrel of the moving body is a back yoke for the driving magnet.

21. A lens driving device according to claim 13, wherein the driving coil is in a cylindrical shape that encircles the moving body, and the fixed body includes a stator yoke that generally encircles the driving coil.

22. A lens driving device according to claim 21, wherein the fixed body has a generally rectangular cross section having an opening to define a cornered C-letter shape.

* * * * *